United States Patent
Huang et al.

(10) Patent No.: US 9,471,111 B2
(45) Date of Patent: Oct. 18, 2016

(54) HINGE MECHANISM AND PORTABLE ELECTRONIC DEVICE

(71) Applicant: Acer Incorporated, New Taipei (TW)

(72) Inventors: Yi-Ta Huang, New Taipei (TW);
Wen-Chieh Tai, New Taipei (TW);
Cheng-Nan Ling, New Taipei (TW);
Hsien-Wei Chen, New Taipei (TW);
Chun-I Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/659,592

(22) Filed: Mar. 16, 2015

(65) Prior Publication Data

US 2016/0224072 A1 Aug. 4, 2016

(30) Foreign Application Priority Data

Feb. 2, 2015 (TW) .............................. 104103415 A

(51) Int. Cl.
*E05D 15/00* (2006.01)
*G06F 1/16* (2006.01)
*E05D 7/06* (2006.01)

(52) U.S. Cl.
CPC ............... *G06F 1/1681* (2013.01); *E05D 7/06* (2013.01); *G06F 1/1616* (2013.01)

(58) Field of Classification Search
CPC ............. Y10T 16/547; Y10T 16/5474; Y10T 16/5475; Y10T 16/541; G06F 1/168; G06F 1/1681; G06F 1/1616; G06F 1/547; E05Y 2900/602; E05Y 2900/606; H04M 1/022; H04M 1/0214; H04M 2/0216; E05D 3/12; E05D 3/122; E05D 3/14; E05D 3/16; E05D 3/06; E05D 11/06; E05D 7/00; E05D 7/06
See application file for complete search history.

(56) References Cited

U.S. PATENT DOCUMENTS

| | | | | |
|---|---|---|---|---|
| 2,642,018 A * | 6/1953 | Weeber | ................ | A01G 9/241 16/365 |
| 3,680,927 A * | 8/1972 | Neureuther | .......... | B23Q 11/085 16/267 |
| 5,937,483 A * | 8/1999 | Cruey | .................... | A01K 97/06 16/366 |
| 7,805,810 B2 * | 10/2010 | Hoffman | ................ | E05D 3/127 16/354 |
| 2007/0117600 A1 * | 5/2007 | Robertson | ........... | H04M 1/0216 455/575.3 |
| 2010/0232100 A1 * | 9/2010 | Fukuma | .................. | F16G 13/18 361/679.01 |

(Continued)

FOREIGN PATENT DOCUMENTS

| CN | 104019120 | 9/2014 |
|---|---|---|
| EP | 2061218 | 5/2009 |

(Continued)

*Primary Examiner* — Chuck Mah
(74) *Attorney, Agent, or Firm* — Jianq Chyun IP Office

(57) ABSTRACT

A hinge mechanism includes first torsion shafts, a first torsion sleeve, second torsion shafts, a second torsion sleeve, a first fixing assembly, a second fixing assembly and a third fixing assembly. The first torsion sleeve is sleeved on the first torsion shafts to link the first torsion shafts. The second torsion sleeve is sleeved on the second torsion shafts to link the second torsion shafts. The first and the second torsion sleeves interfere with each other, so the adjacent first and second torsion shafts drive each other to move. The first fixing assembly is engaged with the adjacent first and second torsion shafts respectively. The second fixing assembly is engaged with the first torsion shaft away from the second torsion shafts. The third fixing assembly is engaged with the second torsion shaft away from the first torsion shafts. The first, second and third torsion shafts interfere with each other.

9 Claims, 5 Drawing Sheets

(56) References Cited

U.S. PATENT DOCUMENTS

| | | | | |
|---|---|---|---|---|
| 2011/0000136 A1* | 1/2011 | Brun | ............ | E05D 3/06 49/358 |
| 2013/0219663 A1* | 8/2013 | Cai | ............ | G06F 1/1681 16/371 |
| 2014/0126133 A1* | 5/2014 | Griffin | ............ | G06F 1/1652 361/679.27 |
| 2014/0174226 A1* | 6/2014 | Hsu | ............ | E05D 3/122 74/98 |
| 2014/0196253 A1* | 7/2014 | Song | ............ | G06F 1/1601 16/225 |
| 2014/0196254 A1* | 7/2014 | Song | ............ | E05D 3/14 16/302 |
| 2014/0217875 A1* | 8/2014 | Park | ............ | H05K 5/0226 312/326 |
| 2015/0013107 A1* | 1/2015 | Shin | ............ | E05D 3/06 16/366 |
| 2015/0176317 A1* | 6/2015 | Lee | ............ | E05D 3/06 16/251 |
| 2015/0184437 A1* | 7/2015 | Wikander | ............ | E05D 3/06 16/354 |
| 2015/0184439 A1* | 7/2015 | Hsu | ............ | G06F 1/16 16/350 |
| 2015/0245510 A1* | 8/2015 | Hsu | ............ | H05K 5/0226 16/250 |
| 2015/0277505 A1* | 10/2015 | Lim | ............ | G06F 1/1681 361/679.27 |
| 2015/0277506 A1* | 10/2015 | Cheah | ............ | G06F 1/1681 361/679.27 |
| 2015/0361696 A1* | 12/2015 | Tazbaz | ............ | H04M 1/022 361/679.27 |

FOREIGN PATENT DOCUMENTS

| | | |
|---|---|---|
| JP | 2005336749 | 12/2005 |
| TW | 201447090 | 12/2014 |
| TW | M491101 | 12/2014 |
| TW | M493613 | 1/2015 |

* cited by examiner

HINGE MECHANISM AND PORTABLE ELECTRONIC DEVICE

CROSS-REFERENCE TO RELATED APPLICATION

This application claims the priority benefit of Taiwan application serial no. 104103415, filed on Feb. 2, 2015. The entirety of the above-mentioned patent application is hereby incorporated by reference herein and made a part of this specification.

BACKGROUND OF THE INVENTION

1. Field of the Invention

The present invention generally relates to a hinge mechanism and a portable electronic device. More particularly, the present invention relates to a hinge mechanism and a portable electronic device using the same.

2. Description of Related Art

Along with development of semiconductor devices and display techniques, electronic devices are continually developed towards directions of miniaturization, multi-function and easy to carry. The commonly used portable electronic devices include smart phones and notebook computers, etc. A structure of the portable electronic device can be folded to reduce its own occupation area, so as to achieve miniaturization of the electronic product. Taking the notebook computer as an example, it is generally consisted of a host and a display device pivotally connected to each other. The user can close the host and the display device of the notebook computer through relative rotation there between to facilitate carrying around, and when the notebook computer is to be used, the display device is opened to facilitate operation.

In general, a hinge mechanism is disposed between the host and the display device of the portable electronic device, such that the host and the display device is capable of rotating relatively to each other to be in an open state or a close state. In detail, gears are usually adapted for pivotal components of the portable electronic device so the display device can rotate relatively to the host at any angles. However, the gears in said design would be exposed by the outer casing of the portable electronic device, which affects the aesthetic appearance of the portable electronic device.

SUMMARY OF THE INVENTION

Accordingly, the present invention is directed to a hinge mechanism and a portable electronic device having the same, wherein the hinge mechanism is driven by multiple axes and concealed by the decorative elements, so as to improve the aesthetic appearance of the portable electronic device having the same.

The present invention provides a hinge mechanism adapted to be pivotally connected between a first body and a second body. The hinge mechanism includes a plurality of first torsion shafts, a plurality of second torsion shafts, a first torsion sleeve, a second torsion sleeve, a first fixing assembly, a second fixing assembly and a third fixing assembly. The first torsion sleeve is sleeved on the first torsion shafts, so as to link the first torsion shafts. The second torsion sleeve is sleeved on the second torsion shafts, so as to link the second torsion shafts. The first torsion sleeve and the second torsion sleeve interfere with each other, such that the first torsion shaft and the second torsion shaft adjacent to each other drive each other to move. The first fixing assembly is engaged with the first torsion shaft and the second torsion shaft adjacent to each other. The second fixing assembly is engaged with the first torsion shaft away from the second torsion shafts. The third fixing assembly is engaged with the second torsion shaft away from the first torsion shafts. The first fixing assembly is disposed between the second fixing assembly and the third fixing assembly and interferes therewith, so as to drive one another to move.

Based on the above-mentioned descriptions, in the hinge mechanism of the present invention, the first torsion sleeve is sleeved on the first torsion shafts, the second torsion sleeve is sleeved on the second torsion shafts, and the first fixing assembly, the second fixing assembly and the third fixing assembly are engaged with the first torsion shafts and the second torsion shafts respectively. As such, the hinge mechanism can achieve the effect of multiple axes linking and rotating owing to the interference between the first and second torsion sleeves, and the interference between the first, second and third fixing assemblies. Therefore, the first body and the second body of the portable electronic device using the same are capable of rotating relatively to each other through the hinge mechanism.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The above-mentioned or other relevant technical principles and the features and effects thereof are clearly presented together with the accompanying drawings in the following depicted embodiments. Note that some of expression words hereinafter regarding direction or orientation, such as 'up', 'down', 'front', 'behind', 'left', 'right', and the like, are directions for references in the attached drawings which are to describe, not to limit, the present embodiment. In addition, in the following embodiments, a same notation or a similar notation is for marking the same or the similar portion.

Figure 1:
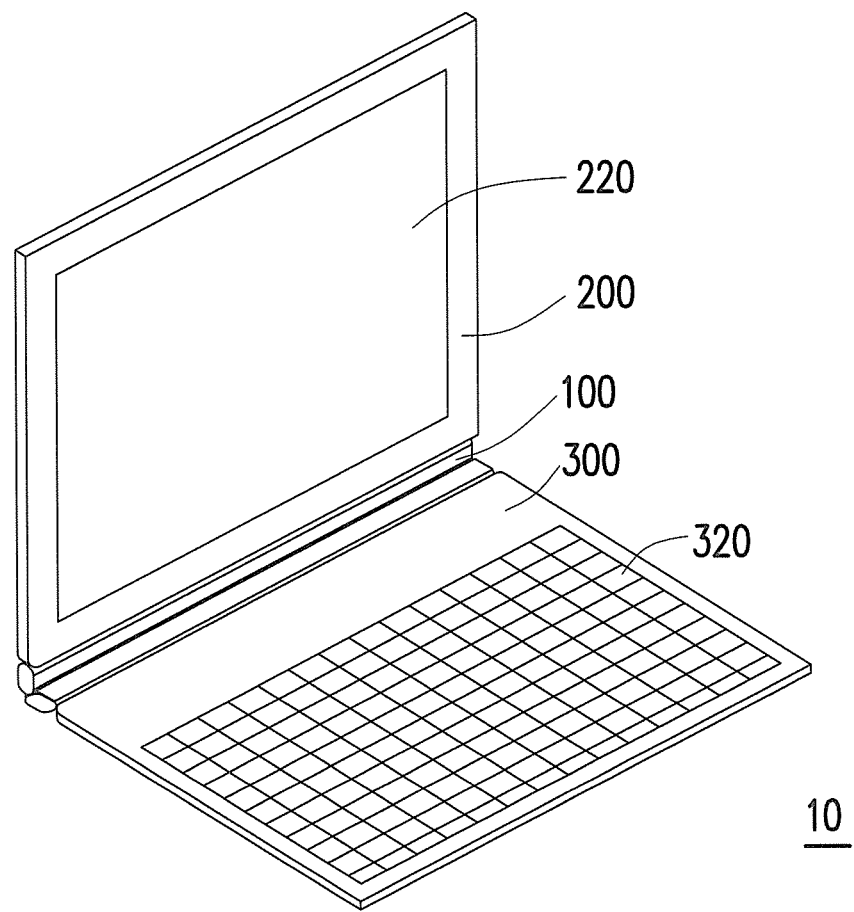
FIG. 1 illustrates a schematic view of a portable electronic device according to an embodiment of the present invention.

FIG. 1 illustrates a schematic view of a portable electronic device according to an embodiment of the present invention. Referring to FIG. 1, a portable electronic device 10 of the present embodiment may include a hinge mechanism 100, a first body 200 and a second body 300. For example, the portable electronic device 10 of the present embodiment may be, for example, a notebook computer, wherein the first body 200 may include a display device 220 and the second body 300 may include a keyboard module 320. The hinge mechanism 100 may be pivotally connected between the first body 200 and the second body 300, such that the first body 200 can rotate relatively to the second body 300. Of course, the present invention is not limited thereto. In other embodiment, the first body 200 may be a tablet PC and the second body 300 may be a docking station for the tablet PC, so that a user can connect the computer peripheral equipment such as mouse, printer, external hard disk, network interface card (NIC), scanner or others to the docking station in long term way, and whenever the user needs the peripheral equipment, the user just connects the tablet PC to the docking station so as to link the tablet PC with the peripheral equipment. In this way, a user not only enjoys the light and handy feature of the tablet PC, but also is exempted from the troubles of putting in for connection and putting out for disconnection between the tablet PC and the peripheral equipment by means of the docking station; meanwhile, the user has the same benefits in terms of functions and expansion possibility as a desktop computer. The present invention does not limit the types of the portable electronic device 10.

Figure 2:
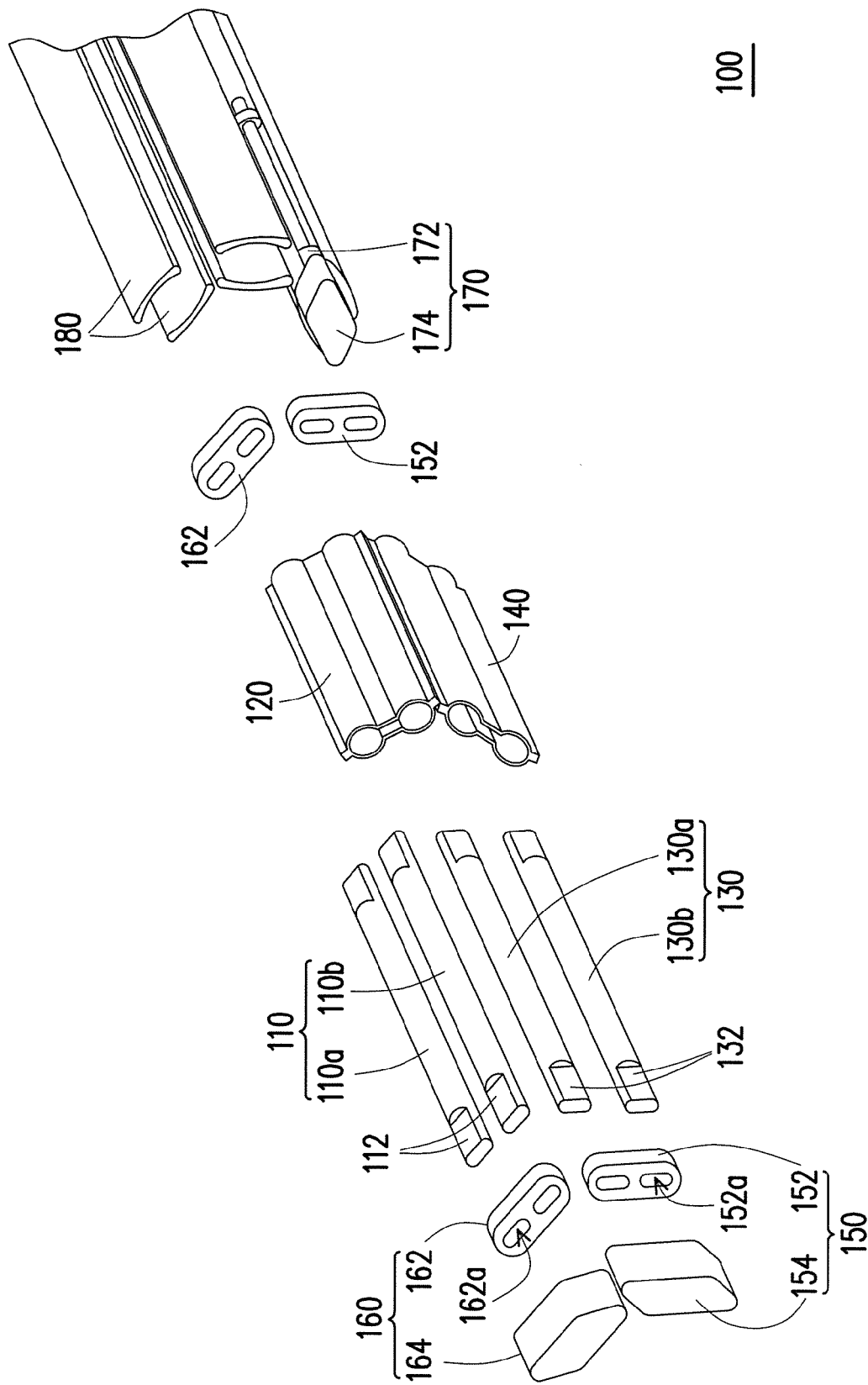
FIG. 2 illustrates an exploded view of a hinge mechanism according to an embodiment of the present invention.
Figure 3:
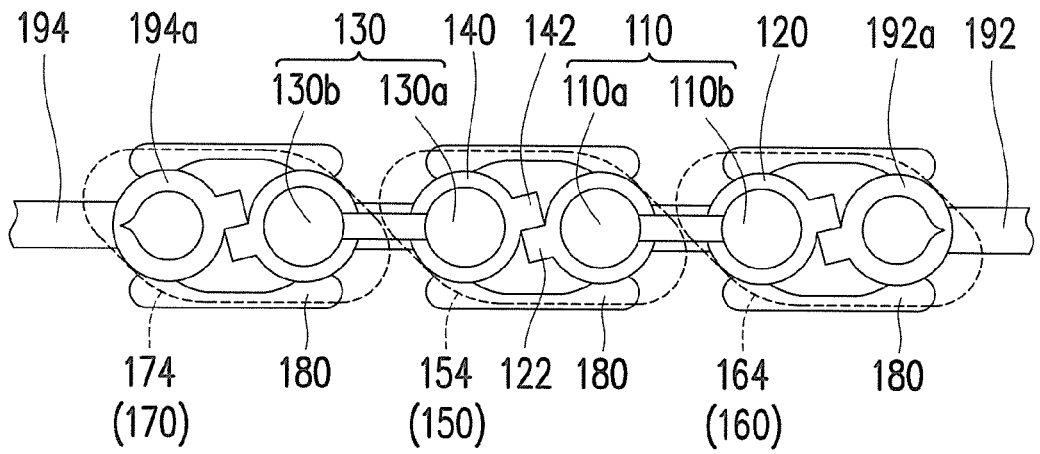
FIG. 3 illustrates a cross-sectional view of the hinge mechanism in FIG. 2.

FIG. 2 illustrates an exploded view of a hinge mechanism according to an embodiment of the present invention. FIG. 3 illustrates a cross-sectional view of the hinge mechanism in FIG. 2. Referring to both FIG. 2 and FIG. 3, in detail, the hinge mechanism 100 of the present embodiment includes a plurality of first torsion shafts 110 (two are illustrated), a first torsion sleeve 120, a plurality of second torsion shafts 130 (two are illustrated), a second torsion sleeve 140, a first fixing assembly 150, a second fixing assembly 160 and a third fixing assembly 170. Each of the first torsion shafts 110 includes a first locking end 112 as shown in FIG. 2, and the first torsion sleeve 120 is sleeved on the first torsion shafts 110 as shown in FIG. 3, such that the first torsion shafts 110 link with each other. Similarly, each of the second torsion shafts 130 includes a second locking end 132 as shown in FIG. 2, and the second torsion sleeve 140 is sleeved on the second torsion shafts 130 as shown in FIG. 3, such that the second torsion shafts 130 link with each other. In addition, the hinge mechanism 100 further includes a plurality of decorative elements 180 to be connected to the first fixing assembly 150, the second fixing assembly 160 and the third fixing assembly 170 to cover the first torsion shafts 110, the second torsion shafts 130, the first torsion sleeve 120 and the second torsion sleeve 140.

Figure 4:
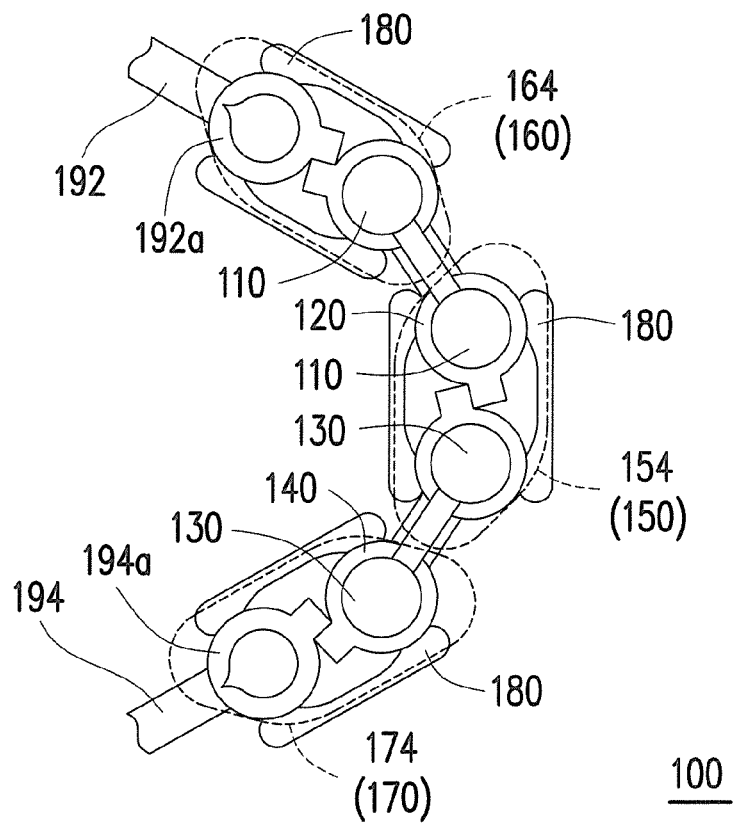
FIG. 4 illustrates a cross-sectional view of the hinge mechanism in FIG. 2 in driving state.

FIG. 4 illustrates a cross-sectional view of the hinge mechanism in FIG. 2 in driving state. Referring to both FIG. 3 and FIG. 4, specifically, the hinge mechanism 100 of the present embodiment has at least two first torsion shafts 110a, 110b and at least two second torsion shafts 130a, 130b, wherein the first torsion shaft 110a and the second torsion shaft 130a are disposed adjacently, the first torsion shaft 110b is disposed away from the the second torsion shafts 130a, 130b, and the second torsion shaft 130b is disposed away from the first torsion shafts 110a, 110b. Moreover, the second torsion sleeve 120 and the first torsion sleeve 140 interfere with each other, such that the adjacent first torsion shaft 110a and the second torsion shaft 130a are capable of driving each other to move. In the present embodiment, the first torsion sleeve 120 includes a first protrusion 122 as shown in FIG. 3, and the second torsion sleeve 140 includes a second protrusion 142 corresponding to the first protrusion 122. The first protrusion 122 and the second protrusion 142 interfere with each other. As such, when the first torsion sleeve 120 rotates relatively to the second torsion sleeve 140 as shown in FIG. 4, the first protrusion 122 and the second protrusion 142 interfere with each other to drive the second torsion sleeve 140 to rotate.

In the present embodiment the first fixing assembly 150 are engaged with the first torsion shaft 110a and the second torsion shaft 130a, the second fixing assembly 160 is engaged with the first torsion shaft 110b away from the second torsion shafts 130a, 130b, and the third fixing assembly 170 is engaged with the second torsion shaft 130b away from the first torsion shafts 110a, 110b. Moreover, the first fixing assembly 150 is disposed between the second fixing assembly 160 and the third fixing assembly 170, and interferes therewith to drive one another to move.

In detail, each of the first torsion shafts 110 includes a first locking end 112, and each of the second torsion shafts 130 includes a second locking end 132 as shown in FIG. 2. The first fixing assembly 150 may include a first fixing element 152 and a first cover element 154. The first fixing element 152 may include a plurality of first locking holes 152a corresponding to the first locking ends 112. The first locking holes 152a are engaged with the first locking end 112 and the second locking end 132 of the adjacent first torsion shaft 110a and the second torsion shaft 130a to prevent the first torsion shaft 110a and the second torsion shaft 130a from rotating relatively to the first fixing assembly 150, so as to generate torsion accordingly. The first cover element 154 is configured to cover the first fixing element 152 and the first locking holes 152a. Similarly, the second fixing assembly 160 may also include a second fixing element 162 and a second cover element 164, and the second fixing element 162 may include a plurality of second locking holes 162a to be engaged with the first locking end 112 of the first torsion shaft 110b furthest from the second torsion shafts 130a, 130b to prevent the first torsion shaft 110b from rotating relatively to the second fixing assembly 160, so as to generate torsion accordingly. The second cover element 154 is configured to cover the second fixing element 162.

Similar to the above-mentioned disposition, the third fixing assembly 170 may include a third fixing element 172 and a third cover element 174, and the third fixing element 172 may include at least one third locking holes to be engaged with the second locking end 132 of the second torsion shaft 130b furthest from the first torsion shafts 110a, 110b to prevent the second torsion shaft 130b from rotating relatively to the third fixing assembly 170, so as to generate torsion accordingly. The third cover element 174 is configured to cover the third fixing element 172. Moreover, the first cover element 154 interferes with the second cover element 164 and the third cover element, such that the first fixing assembly 150, the second fixing assembly 160 and the third fixing assembly 170 are capable of driving one another to move.

Figure 5:
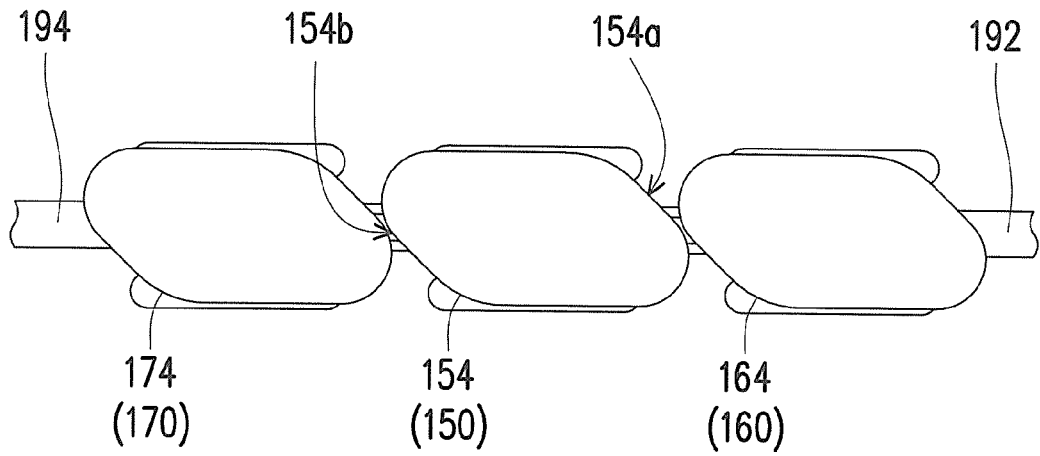
FIG. 5 illustrates a side view of the hinge mechanism in FIG. 2.
Figure 6:
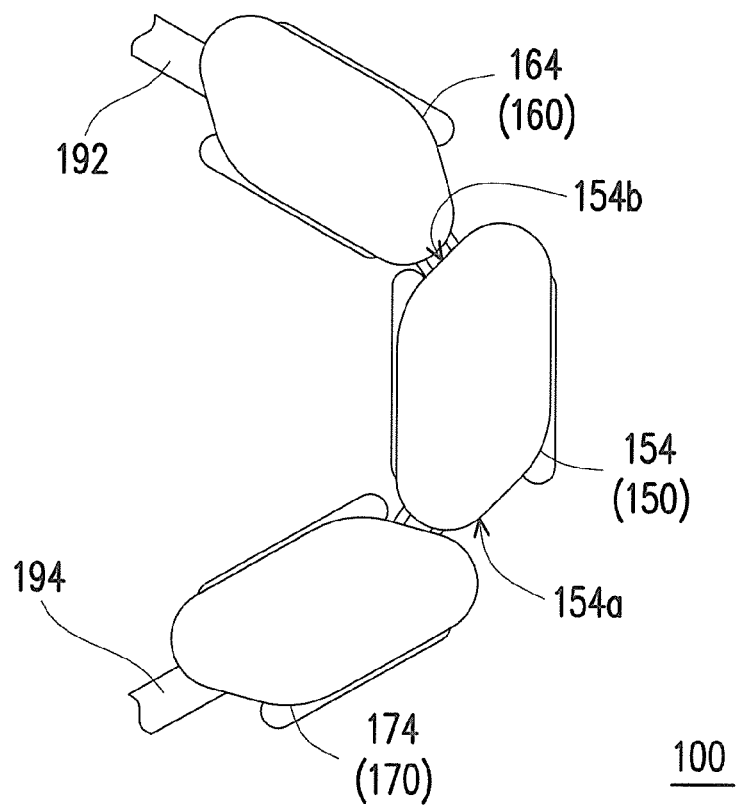
FIG. 6 illustrates a side view of the hinge mechanism in FIG. 2 in driving state.

FIG. 5 illustrates a side view of the hinge mechanism in FIG. 2. FIG. 6 illustrates a side view of the hinge mechanism in FIG. 2 in driving state. Referring to FIG. 3, FIG. 5 and FIG. 6, specifically, the first cover element 154 includes a plurality of driving inclined surfaces 154a, 154b contacting the second cover element 164 and the third cover element 174, and the driving inclined surfaces 154a, 154b are, for example, parallel to each other. To be more specific, the first cover element 154, the second cover element 164 and the third cover element 174 are in parallelogram shaped. With such disposition, when the second fixing assembly 160 rotates relative to the first fixing assembly 150, the second cover element 164 interferes with the corresponding driving inclined surface 154a to drive the first cover element 154 to rotate. At the time, the driving inclined surface 154b of the first cover element 154 interferes with the third cover element 174 to drive the third cover element 174 to rotate.

Figure 7:
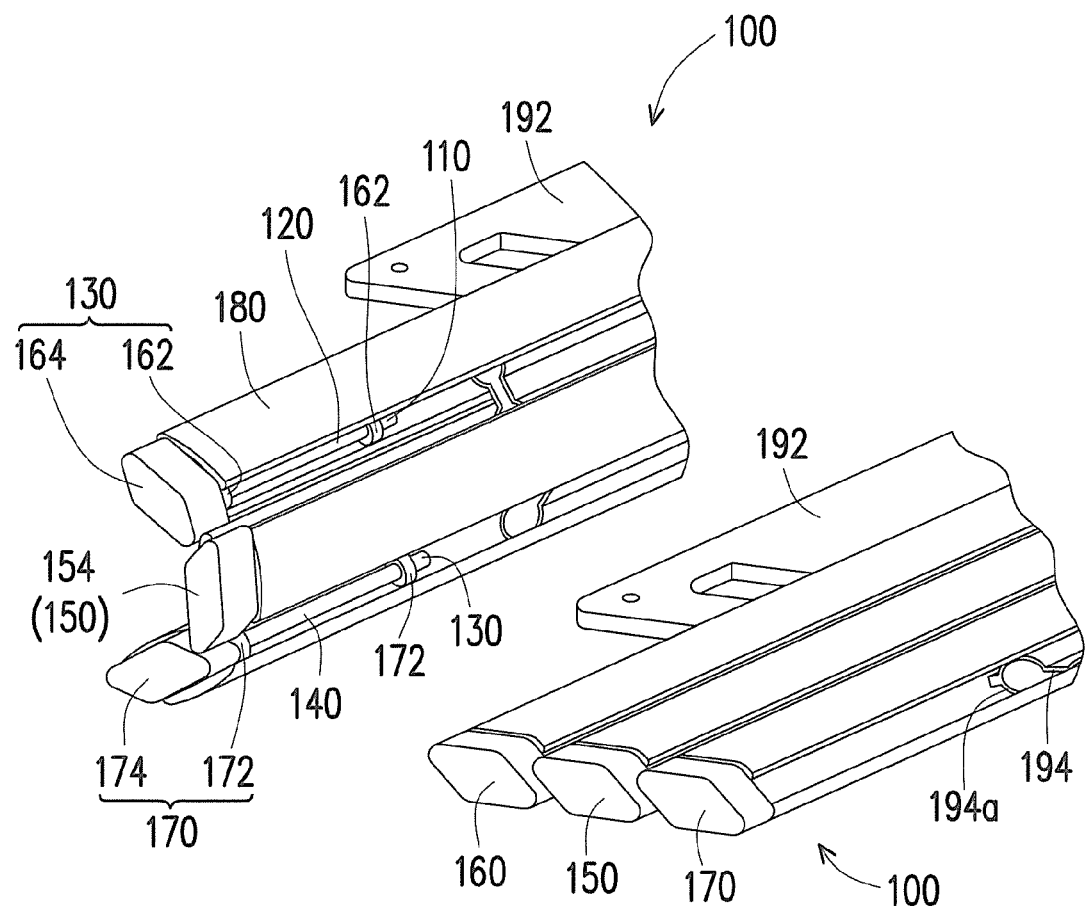
FIG. 7 illustrates schematic views of the hinge mechanism in FIG. 2 in initial state and in driving state.

FIG. 7 illustrates schematic views of the hinge mechanism in FIG. 2 in initial state and in driving state. Referring to FIG. 3 and FIG. 7, in the present embodiment, the decorative elements 180 are connected to the first fixing assembly 150, the second fixing assembly 160 and the third fixing assembly 170 respectively as shown in FIG. 7 to cover the first torsion shafts 110, the second torsion shafts 130, the first torsion sleeve 120 and the second torsion sleeve 140. Therefore, the internal components of the hinge mechanism 100 of the present embodiment are not entirely exposed, so as to improve the aesthetic appearance of the portable electronic device 10.

In addition, in the present embodiment, the hinge mechanism 100 may further include a first connecting element 192 and a second connecting element 194. The first connecting element 192 may be connected to the first body 200 as shown in FIG. 1. The second connecting element 194 may be connected to the second body 300 as shown in FIG. 1. The first connecting element 192 has a first linking end 192a. The decorative elements 180 connected to the second fixing assembly 160 covers and connects the first linking end 192a. Similarly, the second connecting element 194 has a second linking end 194a. The decorative elements 180 connected to the third fixing assembly 170 covers and connects the second linking end 194a.

As such, when a user would like to rotate the first body 200 relatively to the second body 300, all the user has to do is to rotate the first body 200, such that the first body 200 drives the first linking end 192a to rotate upwardly as shown in FIG. 3 to drive the decorative elements 180 connected to the first fixing assembly 150 to rotate upwardly, so as to drive the second cover element 164 and the first torsion sleeve 120 to rotate, and the third cover element 174 and the corresponding decorative elements 180 are driven to rotate by the interference between the first cover element 154 and the second cover element 164 and the interference between the first torsion sleeve 120 and the second torsion sleeve 140, so as to achieve the effect of multiple axes driving each other to rotate, and the first body 200 can rotate relatively to the second body 300 through the multiple axes rotating of the hinge mechanism 100.

In sum, the hinge mechanism of the present invention utilizes the interference between the first torsion sleeve sleeved on the first torsion shafts and the second torsion sleeve sleeved on the second torsion shafts, and the interference between the first fixing assembly, the second fixing assembly and the third fixing assembly respectively engaged with the corresponding first and second torsion shafts, so as to achieve multiple axes linking and rotating. Moreover, the hinge mechanism further includes a plurality of decorative elements covering the first torsion shafts, the second torsion shafts, the first torsion sleeve and the second torsion sleeve. Therefore, internal components of the hinge mechanism are not entirely exposed, so as to improve the aesthetic appearance of the portable electronic device using the hinge mechanism.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A hinge mechanism, adapted to be pivotally connected between a first body and a second body, comprising:
   a plurality of first torsion shafts, wherein each of the first torsion shafts comprises a first locking end;
   a first torsion sleeve rotatably sleeved on the first torsion shafts, so as to link the first torsion shafts;
   a plurality of second torsion shafts, wherein each of the second torsion shafts comprises a second locking end;
   a second torsion sleeve rotatably sleeved on the second torsion shafts, so as to link the second torsion shafts, the first torsion sleeve and the second torsion sleeve engagebly interfering with each other, such that one of the first torsion shafts and one of the second torsion shafts, which are adjacent to each other, drive each other to move;
   a first fixing assembly engaged with one of the first locking ends of the first torsion shaft and one of the second locking ends of the second torsion shaft, which are adjacent to each other;
   a second fixing assembly, adapted to be connected to the first body, engaged with the other first locking end of the first torsion shaft, which is away from the second torsion shafts; and
   a third fixing assembly engaged with the second torsion shaft away from the first torsion shafts, the first fixing assembly disposed between the second fixing assembly and the third fixing assembly and engagebly interfering therewith, so as to drive one another to move upon rotation of one of the second fixing assembly and the third fixing assembly.

2. The hinge mechanism as claimed in claim 1, wherein the second fixing assembly comprises a second fixing element and a second cover element, the second fixing element comprises at least one second locking hole engaged with the first locking end of the first torsion shaft furthest from the second torsion shafts, the second cover element covers the second fixing element, the third fixing assembly comprises a third fixing element and a third cover element, the third fixing element comprises at least one third locking hole engaged with the second locking end of the second torsion shaft furthest from the first torsion shafts, the third cover element covers the third fixing element.

3. The hinge mechanism as claimed in claim 2, wherein the first fixing assembly comprises:
   a first fixing element comprising a plurality of first locking holes respectively engaged with the first locking end and the second locking end of the first torsion shaft and the second torsion shaft adjacent to each other; and
   a first cover element covering the first fixing element and the first locking holes, wherein the first cover element engagebly interferes with the second cover element and the third cover element, such that the first fixing assembly, the second fixing assembly and the third fixing assembly drive one another to move.

4. The hinge mechanism as claimed in claim 3, wherein the first cover element comprises a plurality of driving inclined surfaces contacting the second cover element and the third cover element, the driving inclined surfaces are parallel to each other, when the second fixing assembly rotates relative to the first fixing assembly, the second cover element engagebly interferes with the corresponding driving inclined surface to drive the first cover element to rotate, the third cover element engagebly interferes with the corresponding driving inclined surface to drive the third cover element to rotate.

5. The hinge mechanism as claimed in claim 1, further comprising a plurality decorative elements connecting to the first fixing assembly, the second fixing assembly and the third fixing assembly respectively to cover the first torsion shafts, the second torsion shafts, the first torsion sleeve and the second torsion sleeve.

6. The hinge mechanism as claimed in claim 5, further comprising:
   a first connecting element connecting the first body and having a first linking end, wherein the decorative element, which connects to the second fixing assembly covers and connected to the first linking end; and
   a second connecting element connecting the second body and having a second linking end, wherein the decorative element, which connects to the third fixing assembly covers and connected to the second linking end, such that the first body drives the first linking end so as to rotate relative to the second body through the hinge mechanism.

7. The hinge mechanism as claimed in claim 1, wherein the first torsion sleeve comprises a first protrusion, the second torsion sleeve comprises a second protrusion, when the first torsion sleeve rotates relatively to the second torsion sleeve, the first protrusion engagebly interferes with the second protrusion to drive the second torsion sleeve to rotate.

8. A portable electronic device, comprising:
   a first body;
   a second body;
   the hinge mechanism as claimed in claim 1 pivotally connected between the first body and the second body, such that the first body is capable of rotating relatively to the second body through the hinge mechanism.

9. The portable electronic device as claimed in claim 8, wherein the first body comprises a display, and the second body comprises a keyboard module.

* * * * *